(12) United States Patent
Sheppard et al.

(10) Patent No.: US 12,689,799 B2
(45) Date of Patent: ***Jul. 21, 2026

(54) METHODS, SYSTEMS, ARTICLES OF MANUFACTURE, AND APPARATUS TO ESTIMATE AUDIENCE POPULATION

(71) Applicant: The Nielsen Company (US), LLC, New York, NY (US)

(72) Inventors: Michael Sheppard, Holland, MI (US); Ludo Daemen, Duffel (BE); Edward Murphy, North Stonington, CT (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,153

(22) Filed: Aug. 19, 2024

(65) Prior Publication Data

US 2025/0133265 A1 Apr. 24, 2025

Related U.S. Application Data

(63) Continuation of application No. 18/305,347, filed on Apr. 23, 2023, now Pat. No. 12,069,337, which is a
(Continued)

(51) Int. Cl.
*H04N 21/44* (2011.01)
*G06Q 30/0201* (2023.01)
(Continued)

(52) U.S. Cl.
CPC ... *H04N 21/44222* (2013.01); *G06Q 30/0201* (2013.01); *H04N 21/25883* (2013.01)

(58) Field of Classification Search
CPC ....... H04N 21/44222; H04N 21/25883; G06Q 30/0201
See application file for complete search history.

(56) References Cited

U.S. PATENT DOCUMENTS 1,996,079 A * 4/1935 Murphy ..................... C08J 5/02
264/306
8,849,998 B1 * 9/2014 Merrill ............... G06Q 30/0201
709/224

(Continued)

OTHER PUBLICATIONS

United States Patent and Trademark Office, Non-Final office action, issued in connection with U.S. Appl. No. 18/495,573, mailed on Sep. 13, 2024, 8 pages.

*Primary Examiner* — Timothy R Newlin

(57) ABSTRACT

Methods, apparatus, systems and articles of manufacture are disclosed to estimate an audience population. An example apparatus includes at least one memory; instructions in the apparatus; and processor circuitry to execute the instructions to: determine whether respective ones of respondents are associated with a characteristic; detect unique instances of the respective ones of the respondents; in response to the respective ones of the respondents being associated with the characteristic, increase a sample capture count by one; in response to detecting the unique instances of the respective ones of the respondents exhibiting the characteristic, increase a unique capture count by one; determine a seed population estimate based on the unique capture count; and determine a population estimate having the characteristic based on the sample capture count, the unique capture count, the seed population estimate, and a number of available samples.

14 Claims, 7 Drawing Sheets

Related U.S. Application Data continuation of application No. 17/400,879, filed on Aug. 12, 2021, now Pat. No. 11,659,242, which is a continuation of application No. 16/908,438, filed on Jun. 22, 2020, now Pat. No. 11,095,940.

(51) Int. Cl.
  *H04N 21/258*    (2011.01)
  *H04N 21/442*    (2011.01)

(56)           References Cited

U.S. PATENT DOCUMENTS

| | | | | |
|---|---|---|---|---|
| 8,973,023 | B1 * | 3/2015 | Rao | G06Q 30/0242 |
| | | | | 705/14.44 |
| 11,836,750 | B2 | 12/2023 | Sheppard et al. | |
| 2004/0111773 | A1 * | 6/2004 | Armstrong | A01H 6/4684 |
| | | | | 435/412 |
| 2007/0240181 | A1 * | 10/2007 | Eldering | H04N 21/44224 |
| | | | | 348/E5.002 |
| 2009/0083132 | A1 * | 3/2009 | Doganaksoy | H04L 67/104 |
| | | | | 705/7.29 |
| 2012/0072940 | A1 * | 3/2012 | Fuhrer | H04N 21/25891 |
| | | | | 725/13 |
| 2014/0081767 | A1 * | 3/2014 | Zhang | G06Q 30/0241 |
| | | | | 705/14.66 |
| 2014/0280891 | A1 * | 9/2014 | Doe | G06Q 30/02 |
| | | | | 709/224 |
| 2015/0058876 | A1 * | 2/2015 | Gasnier | H04N 21/632 |
| | | | | 725/16 |
| 2015/0262201 | A1 * | 9/2015 | Rao | G06Q 30/0201 |
| | | | | 705/7.29 |
| 2016/0191970 | A1 * | 6/2016 | Sheppard | G06Q 30/0204 |
| | | | | 725/14 |
| 2018/0060750 | A1 * | 3/2018 | Sheppard | H04H 60/31 |
| 2018/0249210 | A1 * | 8/2018 | Sheppard | G06Q 30/0201 |
| 2018/0249211 | A1 * | 8/2018 | Sheppard | G06Q 30/0201 |
| 2018/0315060 | A1 * | 11/2018 | Sheppard | G06Q 30/0203 |
| 2020/0058037 | A1 * | 2/2020 | Funkhouser | G06Q 30/0201 |
| 2020/0167808 | A1 * | 5/2020 | Sheppard | G06F 17/18 |
| 2021/0084370 | A1 * | 3/2021 | Doe | H04N 21/47202 |

* cited by examiner

METHODS, SYSTEMS, ARTICLES OF MANUFACTURE, AND APPARATUS TO ESTIMATE AUDIENCE POPULATION

RELATED APPLICATION(S)

This application is a continuation of U.S. patent application Ser. No. 18/305,347, which was filed Apr. 23, 2023, and which granted as U.S. Pat. No. 12,069,337, and which is a continuation of U.S. patent application Ser. No. 17/400,879, which was filed Aug. 12, 2021, and which was granted as U.S. Pat. No. 11,659,242, and which is a continuation of U.S. patent application Ser. No. 16/908,438, which was filed on Jun. 22, 2020, and which was granted as U.S. Pat. No. 11,095,940. U.S. patent application Ser. No. 16/908,438; Ser. No. 17/400,879; and Ser. No. 18/305,347 are hereby incorporated herein by reference in its entirety. Priority to U.S. patent application Ser. No. 16/908,438; Ser. No. 17/400,879; and Ser. No. 18/305,347 is hereby claimed.

FIELD OF THE DISCLOSURE

This disclosure relates generally to estimating audience population, and, more particularly, to methods, systems, articles of manufacture, and apparatus to estimate audience population.

BACKGROUND

Population estimation can be performed using ecology procedures such as the capture-recapture procedure. Estimating audience populations using the capture-recapture procedure typically requires collecting one or more samples of the audience. The capture-recapture procedure tags the samples to determine whether the sample is recaptured in a subsequent sample of the audience.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
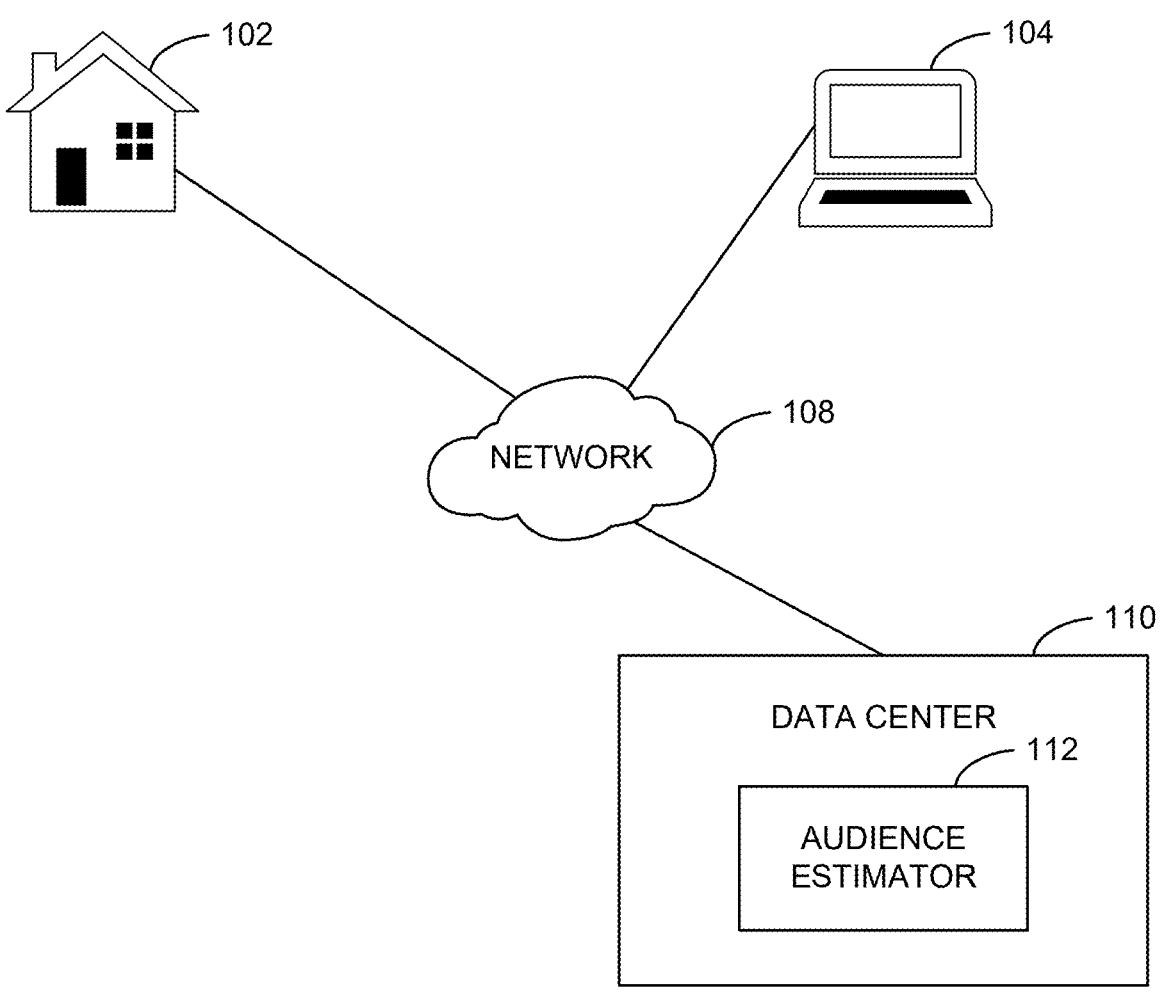
FIG. 1 illustrates an example audience estimation system constructed in accordance with the teachings of this disclosure to estimate audience populations.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, the need for audience estimation has risen in the audience measurement realm. Audience estimation measures audience populations exposed to certain media. In some examples, audience population estimates can be used by an Audience Measurement Entity (AME) to generate ratings. For example, the AME may estimate the audience population that viewed a media program and generate ratings that can be used to determine the media reach, when to display advertisements, etc.

An audience can be estimated using common population estimation procedures known in ecology, such as capture-recapture (CR) models. The CR model (sometimes referred to herein as the CR method) includes collecting a first sample of size $n_1$, marking (e.g., tagging, identifying, etc.) the captured units, and releasing the captured units. As used herein, "unit" refers to the individual object being sampled in the population. For example, in some applications of the CR model the unit can be fish that are being estimated in a pond. In some example applications of the CR model, the unit is a respondent being measured in an audience. The CR method repeats by taking a second sample from the audience of size $n_2$ and determining how many units captured in the second sample were also captured in the first sample (e.g., identify k duplicates). As used herein, "recaptured" refers to a unit that has been captured at least once in a previous sample. That is, when a unit is initially captured for the first time, it is tagged. The tag can then be used to identify the unit if it is collected in a subsequent sample (e.g., recaptured). In some examples, the population, N, is estimated using the Lincoln-Peterson estimator in a manner consistent with example Equation 1.

$$N = \frac{n_1 n_2}{k} \qquad \text{(Equation 1)}$$

The capture-recapture model can vary depending on one or more assumptions. For example, one assumption is that the population being estimated is a closed population (e.g., no births or deaths occur within the time span of the sample, no units enter or leave within the time span of the sample, etc.). The capture-recapture model can also vary based on the capture probability, p. For example, there are four basic models that vary with different capture probability assumptions: an example binomial model with constant recapture probability ($M_0$), an example model when the recapture probability varies with time ($M_t$), an example model when there is a behavioral response to capture ($M_b$), and an example heterogeneity model with different recapture probabilities for different units ($M_h$). A population estimate can also be based on combinations of different capture probability assumptions (e.g., an example model when the recapture probability varies with time and heterogeneity ($M_{th}$), an example model when the recapture probability varies with time and behavior ($M_{tb}$), an example model when the recapture probability varies with behavior and heterogeneity ($M_{bh}$), an example model when the recapture probability varies with time, heterogeneity, and behavior ($M_{thb}$), etc.).

The capture-recapture model can be applied to audience measurement to estimate populations. For example, an AME can collect multiple samples of an audience for certain characteristics (e.g., viewing media, interacting with an advertisement, purchasing a product, etc.). In some examples, the AME continues sampling the audience and keeps track of the recaptured respondents. As used herein, a "respondent" refers to a person that was sampled by the AME (e.g., a captured unit). The AME can then use the CR model with any capture probability assumption(s) (e.g., $M_0$, $M_t$, $M_b$, etc.) to estimate the population. Existing methods of audience estimation using the capture-recapture procedures are computationally intensive. For large sample sizes necessary to accurately estimate an audience, the conventional log-linear model within ecology exceeds computer memory and/or feasible computation time commensurate with reasonable expectations in the technical field of market research.

FIG. 1 illustrates an example audience estimation system 100. The audience estimation system 100 includes an example household 102, an example user device 104, an example network 108, an example data center 110, and an example audience estimator 112.

In the illustrated example of FIG. 1, the household 102 includes respondents of the household 102. In some examples, the respondents are residents, visitors, etc. In some examples, the household 102 is a return path data (RPD) household. That is, RPD households use one or more devices (e.g., set-top-boxes (STBs)) to obtain media from a media distributor, and those same devices facilitate an ability to send some data back to the distributor(s). In some examples, the RPD households (HHs) are panelist households, and in some examples the RPD HHs are not associated with panelist cultivation activities. While one household 102 is illustrated in FIG. 1, the audience estimation system 100 may include any number of households 102.

In the illustrated example of FIG. 1, the user device 104 presents media to the respondents of the household 102. In some examples, the user device 104 is a computing device (e.g., a personal computer, a laptop, a tablet, etc.). For example, the respondent can interact with the user device 104 (e.g., view media, search products and/or phrases, click on advertisements, etc.).

In the illustrated example of FIG. 1, the network 108 facilitates communication between the household 102, the user device 104, and the data center 110. In some examples, any number of households 102 and/or user devices 104 can be communicatively coupled to the data center 110 via the network 108. The communication provided by the network 108 can be via, for example, the Internet, an Ethernet connection, USB cable, etc.

In the illustrated example of FIG. 1, the data center 110 communicates with the household 102 and the user device 104 through the network 108. In some examples, the data center 110 contains the audience estimator 112. In the illustrated example of FIG. 1, the data center 110 is an execution environment used to implement the audience estimator 112. In some examples, the data center 110 is associated with a media monitoring entity (e.g., an AME, etc.). In some examples, the data center 110 can be a physical processing center (e.g., a central facility of the media monitoring entity, etc.). Additionally or alternatively, the data center 110 can be implemented via a cloud service (e.g., AWS, etc.). In this example, the data center 110 can further store and process respondent data.

In the illustrated example of FIG. 1, the audience estimator 112 samples the household 102. In some examples, the audience estimator 112 samples the respondents of the household 102 (e.g., monitors the user device 104). The audience estimator 112 tags the respondents to track recaptured respondents over two or more samples. The audience estimator 112 determines an audience population estimate based on the audience samples and a recapture probability assumption. In some examples, the audience estimator 112 is an application-specific integrated circuit (ASIC), and in some examples the audience estimator 112 is a field programmable gate array (FPGA). Alternatively, the audience estimator 112 can be software located in the firmware of the data center 110.

Figure 2:
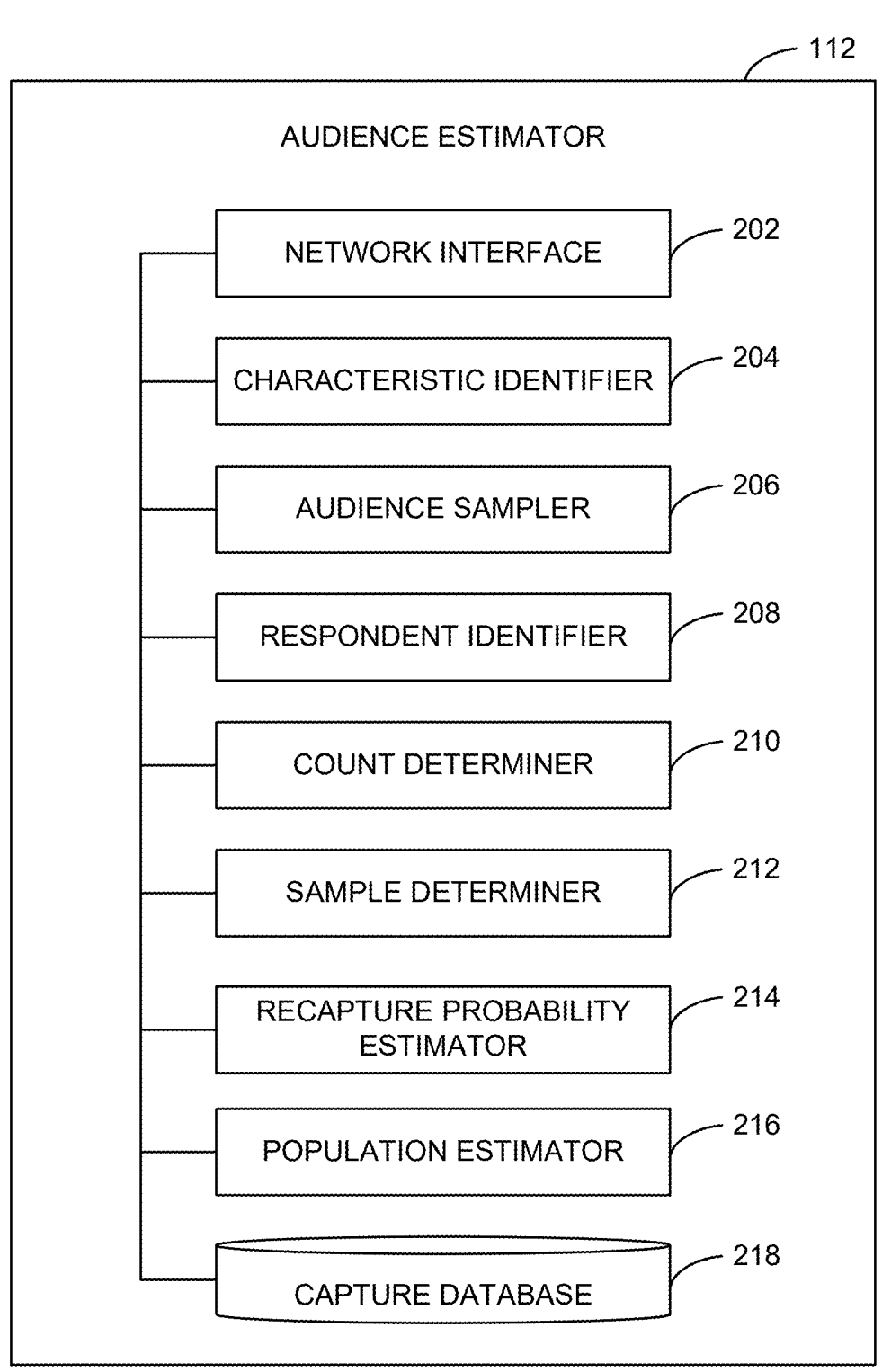
FIG. 2 is a block diagram of an example audience estimator of FIG. 1.

FIG. 2 is a block diagram of the example audience estimator 112 of FIG. 1. In the illustrated example of FIG. 2, the audience estimator 112 includes a network interface 202, a characteristic identifier 204, an audience sampler 206, a respondent identifier 208, a count determiner 210, a sample determiner 212, a recapture probability estimator 214, a population estimator 216, and a capture database 218.

In the illustrated example of FIG. 2, the network interface 202 collects respondent data from the example network 108 of FIG. 1. In some examples, the network interface 202 is in continuous communication with the network 108. In other examples, the network interface 202 is in periodic communication with the network 108.

In the illustrated example of FIG. 2, the characteristic identifier 204 determines whether the sampled respondent has a characteristic. In some examples, the characteristic identifier 204 includes means for identifying a characteristic (sometimes referred to herein as a characteristic identifying means). The example means for identifying a characteristic is hardware. For example, the audience estimator 112 is structured to estimate a subset of the audience. That is, the audience estimator 112 may estimate a portion of the audience with a certain characteristic. The example characteristic identifier 204 determines whether the respondent has the desired characteristic (e.g., viewed a certain media, viewed an advertisement, is part of a certain demographic, etc.). In some examples, the characteristic identifier 204 determines the respondent has a characteristic by accessing data logs associated with the media access control (MAC) address, accessing cookie storage, accessing browser history, etc. of the user device 104. For example, if the characteristic of interest is purchasing a product, the characteristic identifier 204 can determine whether the respondent visited the product website.

In the illustrated example of FIG. 2, the audience estimator 112 includes the audience sampler 206 to sample the household 102 for respondent data. In some examples, the audience sampler 206 includes means for audience sampling (sometimes referred to herein as an audience sampling means). The example means for audience sampling is hardware. For example, the audience may include panelists sampled with a meter. In other examples, the audience sampler 206 samples the audience from at least one of a server log, a software development kit (SDK) tag, uniform resource locator (URL) redirect, media access control (MAC) address, and internet protocol (IP) address, etc. The audience sampler 206 may store the respondent data (e.g., identifying information of the respondent) in the capture database 218.

In the illustrated example of FIG. 2, the audience estimator 112 includes the respondent identifier 208 to identify the respondent. In some examples, the respondent identifier 208 includes means for identifying a respondent (sometimes referred to as a respondent identifying means). The example means for identifying a respondent is hardware. That is, the respondent identifier 208 determines whether the respondent is a recaptured respondent. For example, the respondent identifier 208 compares the respondent data including a person identifier (e.g., an Internet cookie, a MAC address, etc.) to previously stored respondent data stored in the capture database 218. If the respondent identifier 208 identifies a match between the captured respondent and the stored respondent data, the respondent identifier 208 determines the respondent is a recaptured respondent.

In the illustrated example of FIG. 2, the audience estimator 112 includes the count determiner 210 to determine counts of the respondents sampled by the audience sampler 206. In some examples, the count determiner 210 includes means for determining counts (sometimes referred to as a count determining means). The example means for determining counts is hardware. For example, the count determiner 210 determines a unique capture count, n. As used herein, the "unique capture count" is a count of respondents that are not recaptured respondents over a plurality of samples. For example, the count determiner 210 increments the unique capture count by one in response to the respondent identifier 208 determining the respondent is not a recaptured respondent (e.g., the respondent does not match the respondent identifying data stored in the capture database 218). In some examples, the count determiner 210 further determines a sample capture count, $n_i$. As used herein, the "sample capture count" is a count of the respondents for the sample i. In examples disclosed herein, the sample capture count is a count of respondents (e.g., including recaptured respondents). In some examples, the count determiner 210 determines a total capture count, m. As used herein, the "total capture count" is a count of the respondents across all samples. That is, the total capture count is the sum of the one or more sample capture counts. In some examples, the count determiner 210 stores the unique capture count, the sample capture count, and/or the total capture count in the capture database 218.

In the illustrated example of FIG. 2, the audience estimator 112 includes the sample determiner 212 to determine the size, duration, and number of audience samples collected, k. In some examples, the sample determiner 212 includes means for determining a sample (sometimes referred to as a sample determining means). The example means for determining a sample is hardware. That is, the audience sampler 206 may determine how long to sample the audience, how many respondents to sample, etc. For example, the sample determiner 212 may determine to continue sampling the audience for the duration of an advertisement, the duration of a media program (e.g., the Superbowl, etc.). The sample determiner 212 may also determine the number of samples to collect. In some examples, the sample determiner 212 continues sampling in response to the number of samples not satisfying a sample threshold. For example, the sample threshold may be 5 samples (e.g., the audience estimator 112 must collect at least 5 samples). For example, the audience estimator 112 may determine a first estimate of the audience using the number of samples and a second estimate of the audience without using the number of samples. The sample determiner 212 may determine to collect additional samples in response to the difference between the first and second audience estimates being greater than a population estimate threshold. In some examples, the population estimate threshold is 10 units, 50 units, etc.

In the illustrated example of FIG. 2, the audience estimator 112 includes the recapture probability estimator 214 to determine a recapture probability. In some examples, the recapture probability estimator 214 includes means for estimating a recapture probability (sometimes referred to as a recapture probability estimating means). The example means for estimating a recapture probability is hardware. That is, the recapture probability estimator 214 determines which model assumption and/or model to use for audience estimation (e.g., $M_0$, $M_t$, etc.). For example, the recapture probability estimator 214 may determine the recapture probability is constant ($M_0$). In some examples, the recapture probability estimator 214 may determine the recapture probability varies with time ($M_t$). In other examples, the recapture probability estimator 214 determines the recapture probability varies with behavior ($M_b$), varies with each unit ($M_h$), etc. In some examples, the recapture probability estimator 214 determines the recapture probability based on a combination of model assumptions (e.g., the recapture probability varies with time and individual ($M_{th}$), etc.).

In the illustrated example of FIG. 2, the audience estimator 112 includes the population estimator 216 to estimate the audience population. In some examples, the population estimator 216 includes means for estimating a population (sometimes referred to as a population estimating means). The example means for estimating a population is hardware. In examples disclosed herein, the population estimator 216 estimates the audience based on the model assumptions and associated recapture probability determined by the recapture probability estimator 214. In some examples, the audience estimator 112 determines a model assumption by comparing the recapture probability determined by the recapture probability estimator to a probability threshold. For example, the recapture probability estimator 214 may determine the recapture probability for respondents is constant (e.g., satisfies the probability threshold) and, thus, the population estimator 216 uses the $M_0$ model. The log-linear model, expressed in the multiplicative form, has the following constraints defined in a manner consistent with example Equation 2 and Equation 3.

$$\sum_{i=1}^{k}\binom{k}{i}z_0 z_1^i = n \qquad \text{(Equation 2)}$$

$$\sum_{i=1}^{k}i\binom{k}{i}z_0 z_1^i = m \qquad \text{(Equation 3)}$$

As described above, i is the index of the current sample, k is the number of samples collected, n is the unique capture count, and m is the total capture count. The variable $z_0$ is the number of units in the population that have not been captured and the variable $z_1$ is the odds of the unit being captured within the population subject to what has been observed.

The left hand sides of example Equation 2 and example Equation 3 can be evaluated using variations of the binomial formula expressed in a manner consistent with example Equation 4 below.

$$(x+y)^k = \sum_{i=0}^{k}\binom{k}{i}x^i y^{k-i} \qquad \text{(Equation 4)}$$

With $x=z_1$ and $y=1$, example Equation 4 can be substituted into example Equation 2 and example Equation 3 to produce example Equation 5 and example Equation 6 below.

$$z_0\left((1+z_1)^k - 1\right) = n \qquad \text{(Equation 5)}$$

$$kz_0z_1(1+z_1)^{(k-1)} = m \qquad \text{(Equation 6)}$$

Thus, if Q is defined in a manner consistent with example Equation 7 below, example Equation 5 and example Equation 6 can be rewritten to example Equation 8 and example Equation 9 below.

$$Q = z_0(1+z_1)^k \qquad \text{(Equation 7)}$$

$$Q - z_0 = n \qquad \text{(Equation 8)}$$

$$\frac{kz_1Q}{1+z_1} = m \qquad \text{(Equation 9)}$$

In this example, Q is the estimate of the population (e.g., the audience). Thus, based on example Equation 8, the estimate of the population (e.g., Q) is based on the number of unique units (e.g., n) observed with $z_0$ units missing (e.g., have not been captured). Thus, example Equation 8 can be rewritten in a manner consistent with example Equation 10, example Equation 12, example Equation 12, and example Equation 13.

$$\frac{Q}{Q-n} = \frac{Q}{z_0} \qquad \text{(Equation 10)}$$

$$\frac{Q}{Q-n} = (1+z_1)^k \qquad \text{(Equation 11)}$$

$$\frac{Q}{Q-n} = \left(1 + \frac{m}{kQ-m}\right)^k \qquad \text{(Equation 12)}$$

$$\frac{Q}{Q-n} = \left(\frac{kQ}{kQ-m}\right)^k \qquad \text{(Equation 13)}$$

Taking the reciprocal of both sides of example Equation 13 and simplifying the fractions results in example Equation 14.

$$1 - \frac{n}{Q} = \left(1 - \frac{(m/k)}{Q}\right)^k \qquad \text{(Equation 14)}$$

Example Equation 14 can be solved by iteration (e.g., $Q \leftarrow (Q_0 > n)$). Solving example Equation 14 by iterating until convergence produces example Equation 15.

$$Q \leftarrow \frac{n}{1 - \left(1 - \frac{(m/k)}{Q}\right)^k} \qquad \text{(Equation 15)}$$

In some examples, the population estimator 216 can estimate the audience population using example Equation 15. That is, the example count determiner 210 determines the unique capture count, n, and the total capture count, m. The example sample determiner 212 determines the number of samples, k. Thus, the example population estimator 216 uses the unique capture count, the total capture count, and the number of samples to estimate the audience population.

The example population estimator 216 can also solve for the number of units not observed, $z_0$, in a manner consistent with example Equation 16.

$$z_0 = Q - n \qquad \text{(Equation 16)}$$

The odds of being captured, $z_1$, can be solved using example Equation 9 defining Q. Additionally, the log-linear parameters, $\beta_i$, can be solved in a manner consistent with example Equation 17.

$$z_i = e^{\beta_i} \qquad \text{(Equation 17)}$$

That is, the log-linear parameters represent the log of the number of units that are not captured, $\beta_0$, and the log-odds of being captured, $\beta_1$.

The population estimator 216 determines a seed population estimate (e.g., starting population), $Q_0$. In examples disclosed herein, the seed population estimate is greater than the unique capture count (e.g., $Q_0 > n$). For example, the population estimator 216 may determine the seed population estimate is an interval greater than the unique capture count (e.g., n+10, n+50, etc.), is a multiple of the unique capture count (e.g., 2×n, 5×n, etc.), is a rounded integer (e.g., rounded to the nearest 10, rounded to the nearest 100, etc.).

In some examples, the sample determiner 212 may determine to collect ten samples (e.g., k=10). The count determiner 210 may count 102 unique respondents (e.g., n=102) and 169 total respondents (e.g., m=169) over the ten samples. The population estimator 216 can determine the seed population estimate is 200. Thus, the example population estimator 216 can use example Equation 15 and iteration illustrated in Table 1 to estimate the audience population.

TABLE 1

| l | Q |
|---|---|
| 0 | 200 |
| 1 | 173.944 |
| 2 | 159.337 |
| 3 | 151.309 |
| 4 | 146.961 |
| 5 | 144.629 |
| . . . | . . . |
| ∞ | 141.978 |

In the above illustrated example, the population estimator 216 determines the audience population is 142 units (e.g., Q=141.978). The population estimator 216 continues iterating example Equation 15 (e.g., incrementing the iteration variable, l), until convergence. That is, the example population estimator 216 determines the audience population estimate in response to the difference between adjacent estimates (e.g., the $l^{th}$ and $(l+1)^{th}$ estimate) is less than an error threshold.

The example sample determiner 212 determines whether to continue sampling the audience in response to the example population estimator 216 determining a first audience estimate. For example, there is an upper limit to the population estimate, Q, when the unique capture count and the total capture count are constant but the number of samples goes to infinity (e.g., k>∞). Example Equation 15 can be written as example Equation 18.

$$1 - \frac{n}{Q} = \left(1 - \frac{m/Q}{k}\right)^k \qquad \text{(Equation 18)}$$

When the number of samples goes to infinity, the right hand side of example Equation 18 converges to exp(−m/Q). Thus, example Equation 18 can be simplified to the limiting equation expressed as example Equation 19 below when k→∞.

$$1 - \frac{n}{Q} = \exp(-m/Q) \qquad \text{(Equation 19)}$$

The example population estimator 216 can use example Equation 19 to estimate the audience population based on the unique capture count and the total capture count (e.g., determine a second audience population estimate). That is, in contrast to example Equation 15, example Equation 19 does not rely on the number of samples, k, to determine an audience population estimate.

The example population estimator 216 can determine a first audience population estimate based on example Equation 15 and determine a second audience population estimate based on example Equation 19. Following the example outlined above and using example Equation 19, the example population estimator 216 can determine the second audience population estimate is 153 (e.g., Q=152.003). In some examples, the sample determiner 212 can compare the first audience population estimate and the second audience population estimate to determine whether to continue sampling the audience. For example, the sample determiner 212 may determine there is a difference of 11 audience members (e.g., 153×142=11) between the first and second audience population estimates. The example sample determiner 212 determines whether to continue sampling the audience based on whether the difference between the first and second audience population estimates exceeds a population estimate threshold. In some examples, the population estimate threshold is 10. In response to a population estimate threshold of 10, the example sample determiner 212 determines to continue sampling the audience because the difference between the first and second audience population estimates (e.g., 11) is greater than the population estimate threshold (e.g., 10). That is, the example sample determiner 212 may determine the first and/or second audience population samples do not accurately represent the audience population. For example, if the audience sampler 206 does not accumulate enough samples, the unique capture count and the total capture count may not model (e.g., represent) the audience accurately. Thus, the sample determiner 212 may determine to continue sampling the audience.

In examples disclosed herein, the population estimate threshold can be greater than or less than 10, but examples disclosed herein are not limited thereto. For example, the population estimate threshold can be 100. The population estimate threshold can be user-defined to reflect user preference. For example, the population estimate threshold may be lower to generate a more accurate audience population estimate (e.g., a greater number of samples are more likely to model the audience accurately). In some examples, the population estimate threshold may be higher to reduce computing resources used to estimate the audience (e.g., computing time, storage, etc.). That is, a greater difference between the first and second audience population estimates is acceptable to reduce computing time and storage requirements associated with collecting additional samples, performing additional estimations, etc.

In another example, the recapture probability estimator 214 may determine that the recapture probability varies with time (e.g., the recapture probability does not satisfy the probability threshold). Thus, the population estimator 216 follows the $M_t$ model to estimate the audience population. The $M_t$ model is expressed in a manner consistent with example Equation 20.

$$n(e_1 e_2 e_3 \ldots) = \exp\left(\beta_0 + \sum_{e_j=1} \beta_j\right) \qquad \text{(Equation 20)}$$

In example Equation 20, n is the number of samples, $e_i$ are the units captured in sequence order of capture, $\beta_0$ is the intercept, and $\beta_j$ are the parameters corresponding to the sample. In examples disclosed herein, the variable $e_j$ is a Boolean variable corresponding to whether the unit was captured (e.g., 1) or not (e.g., 0) at time j. In other words, the number of units captured in a specific sequence of samples (e.g., the left hand side of example Equation 20) is equal to the exponent of the linear expression of the intercept and the parameters corresponding to those samples (e.g., the right hand side of example Equation 20). The intercept, $\beta_0$, indicates the unit is a member of the population. Each parameter, $\beta_j$, defines how each capture probability varies across time for each sample j. Once the parameters are solved, an estimate of the non-captured units (e.g., $e_j$=0) that are part of the population is defined in a manner consistent with example Equation 21 below.

$$n(000 \ldots) = \exp(\beta_0) \qquad \text{(Equation 21)}$$

Thus, the estimate of the total population is the sum of the captured units (e.g., units sampled) and the estimate of the non-captured units given by example Equation 21.

Previous methodology uses the log-linear model to estimate a population using the capture-recapture method. For example, the sample determiner 212 may determine to collect 6 samples (e.g., k=6) resulting in 68 units captured (e.g., n=68). In some examples, the samples are stored in a data log with values of 0 and 1 if the $i^{th}$ unit was captured in the $j^{th}$ sample. An example data log is illustrated in Table 2 below.

TABLE 2

| Unit | $k_1$ | $k_2$ | $k_3$ | $k_4$ | $k_5$ | $k_6$ |
|------|------|------|------|------|------|------|
| [01, ] | 1 | 1 | 1 | 1 | 1 | 1 |
| [02, ] | 1 | 1 | 1 | 1 | 1 | 1 |
| [03, ] | 1 | 1 | 0 | 0 | 0 | 1 |
| [04, ] | 1 | 1 | 0 | 0 | 1 | 0 |
| [05, ] | 1 | 0 | 1 | 1 | 0 | 0 |
| . . . | | | | | | |
| [64, ] | 0 | 0 | 0 | 0 | 1 | 0 |
| [65, ] | 0 | 0 | 0 | 0 | 0 | 1 |
| [66, ] | 0 | 0 | 0 | 0 | 0 | 1 |
| [67, ] | 0 | 0 | 0 | 0 | 0 | 1 |
| [68, ] | 0 | 0 | 0 | 0 | 0 | 1 |

The rows of Table 2 represent each unit captured (e.g., 68 rows for each of the 68 unique units). The columns of Table 2 represent each sample collected (e.g., 6 total samples $k_1$, $k_2$, $k_3$, $k_4$, $k_5$, $k_6$). In the illustrated example of Table 2, Unit 4 (e.g., row 4) was captured three total times (e.g., sample 1, sample 2, and sample 5). In another example, Unit 68 (e.g., row 68) was captured one time (e.g., sample 6). The total number of units captured in each sample is the sum of the columns (e.g., the sample capture count). In this example, the sample capture count is $\{n_i\}=\{16, 28, 20, 26, 23, 32\}$.

The log-linear model is defined in example Equation 22 below.

$$Y_i = \exp(\beta_0 + \sum \beta_j[i = j]) \qquad \text{(Equation 22)}$$

The bracket (e.g., [i=j]) in example Equation 22 is the Iverson bracket, which equals one if true and zero otherwise. The generalized linear model requires $2^k-1$ rows, which represent all combinations of being captured across the k samples. In the example described above, the model requires $2^6-1$ (e.g., 63) rows. An example generalized linear model is illustrated in Table 3 below.

TABLE 3

| i | Y | $\beta_0$ | $\beta_1$ | $\beta_2$ | $\beta_3$ | $\beta_4$ | $\beta_5$ | $\beta_6$ |
|---|---|-----------|-----------|-----------|-----------|-----------|-----------|-----------|
| 01 | 2 | 1 | 1 | 1 | 1 | 1 | 1 | 1 |
| 02 | 0 | 1 | 1 | 1 | 1 | 1 | 1 | 0 |
| 03 | 0 | 1 | 1 | 1 | 1 | 1 | 0 | 1 |
| 04 | 0 | 1 | 1 | 1 | 1 | 1 | 0 | 0 |
| 05 | 0 | 1 | 1 | 1 | 1 | 0 | 1 | 1 |
| ... |
| 59 | 4 | 1 | 0 | 0 | 0 | 1 | 0 | 1 |
| 60 | 3 | 1 | 0 | 0 | 0 | 1 | 0 | 0 |
| 61 | 2 | 1 | 0 | 0 | 0 | 0 | 1 | 1 |
| 62 | 4 | 1 | 0 | 0 | 0 | 0 | 1 | 0 |
| 63 | 4 | 1 | 0 | 0 | 0 | 0 | 0 | 1 |

In contrast to Table 2, the rows of Table 3 do not represent each unit captured. For example, row 1 (e.g., i=1) illustrates there are two units (e.g., Y=2) that are in the population (e.g., $\beta_0=1$) and captured in every sample (e.g., $\beta_1=\beta_2=\beta_3=\beta_4=\beta_5=\beta_6=1$). In another example, row 63 (e.g., i=1) illustrates there are four units (e.g., Y=4) in the population (e.g., $\beta_0=1$) that are only captured in the sixth sample (e.g., $\beta_1=\beta_2=\beta_3=\beta_4=\beta_5=0$ and $\beta_6=1$).

The generalized linear model can be solved such that $$\beta_0 = 1.9553$$
$$\beta_1 = -1.3061$$
$$\beta_2 = -0.5194$$
$$\beta_3 = -1.0128$$
$$\beta_4 = -0.6351$$
$$\beta_5 = -0.8170$$
$$\beta_6 = -0.2970$$

Thus, example Equation 22 can be solved using the parameters to determine eight units were in the population that were never captured (e.g., $Y=\exp(1.9553)=7.0660$). Therefore, the total population estimate is 76 (e.g., captured units+units not captured in the population=68+8=76). As described above, the log-linear model requires the terms of Table 2 and Table 3 to be stored in memory. Table 2 includes 408 terms of 0s and 1s (e.g., 68 rows×6 samples=408 terms). Table 3 includes 504 terms (e.g., 63 rows×8 terms=504 terms). Thus, 912 terms (e.g., 408+504=912) must be stored in memory for the log-linear model.

Alternatively, to avoid the problems above, the example population estimator 216 can use iteration to estimate the population with the $M_t$ model. For example, letting $z_j=\exp(\beta_j)$, example Equation 20 can be reduced to a multiplicative form defined in example Equation 23.

$$n(e_1e_2e_3 \ldots) = z_0 \prod_{e_j=1} z_1 \qquad \text{(Equation 23)}$$

Thus, the units in the population that are not captured (e.g., $z_0$) are defined by example Equation 24.

$$n(000 \ldots) = z_0 \qquad \text{(Equation 24)}$$

The total population size, $\hat{N}$, can be estimated as the sum of the unique capture count, n, (e.g., determined by the count determiner 210) and the units not captured (e.g., $\hat{N}=n+z_0$).

Table 4 is an example chart illustrating the multiplicative form for t=2, where t represents the time periods that influence the recapture probability (e.g., samples).

TABLE 4

| Number | Parameters | Meaning |
|--------|-----------|---------|
| $n_{10}$ | $z_0z_1$ | Time 1 only |
| $n_{01}$ | $z_0z_2$ | Time 2 only |
| $n_{11}$ | $z_0z_1z_2$ | Time 1 and Time 2 |
| $n_{00}$ | $z_0$ | Never captured |

For example, row 1 illustrates the units that were captured at time 1 only, row 2 illustrates the units that were captured at time 2 only, row 3 illustrates the units that were captured at both time 1 and time 2, and row 4 illustrates the units that were never captured.

In another example, for t=3, there are four constraints that the log-linear model must satisfy. The four constraints are illustrated in example Equation 25, example Equation 26, example Equation 27, and example Equation 28.

$$n_{100} + n_{110} + n_{101} + n_{111} = n_1 \qquad \text{(Equation 25)}$$
$$n_{010} + n_{110} + n_{011} + n_{111} = n_2 \qquad \text{(Equation 26)}$$
$$n_{001} + n_{101} + n_{001} + n_{111} = n_3 \qquad \text{(Equation 27)}$$
$$n_{100} + n_{010} + n_{001} + n_{110} + n_{101} + n_{011} + n_{111} = n_4 \qquad \text{(Equation 28)}$$

For example, example Equation 25 illustrates the units that were captured at time 1 (e.g., have '1' as the first index) and may or may not have been captured at another time. For example, the units may also be captured at a later time (e.g., $n_{110}$ also captured at time 2, $n_{101}$ also captured at time 3, and $n_{111}$ also captured at both time 2 and 3). Example Equations 25, 26, 27 can be rewritten to example Equation 29, example Equation 30, and example Equation 31.

$$z_0 z_1 (1 + z_2 + z_3 + z_2 z_3) = n_1 \quad \text{(Equation 29)}$$

$$z_0 z_2 (1 + z_1 + z_3 + z_1 z_3) = n_2 \quad \text{(Equation 30)}$$

$$z_0 z_3 (1 + z_1 + z_2 + z_1 z_2) = n_3 \quad \text{(Equation 31)}$$

In another example, when t=4, the second constraint with $n_2$ is illustrated in example Equation 32.

$$z_0 z_2 (1 + z_1 + z_3 + z_4 + z_1 z_3 + z_1 z_4 + z_3 z_4 + z_1 z_3 z_4) = n_2 \quad \text{(Equation 32)}$$

Thus, it can be observed that the expression is the sum of every combination of z's one at a time, two at a time, to (t−1) at a time, excluding the $z_i$ term for the sample under study (e.g., in example Equation 32, i=2). For example, if the $z_0 z_2$ term is expanded across Equation 32, Equation 32 would represent every combination of being captured or not captured across the t times with the guarantee that the unit is a member of the population (e.g., the $z_0$ term), the unit was captured at time i=2 (e.g., the $z_2$ term), and the unit may or may not have been captured across all other times before or later time i, up to the end of the experiment at time n.

In general, the algebraic principle of binomials can be used to rearrange algebraic expressions. For example, Equation 33, Equation 34, and Equation 35 illustrate one, two, and three factorials in their expanded form.

$$1 + a = 1 + a \quad \text{(Equation 33)}$$

$$(1 + a)(1 + b) = 1 + a + b + ab \quad \text{(Equation 34)}$$

$$(1 + a)(1 + b)(1 + c) = 1 + a + b + c + ab + ac + bc + abc \quad \text{(Equation 35)}$$

The left hand side of example Equations 33, 34, 35 are the product of n terms, while the right hand side is the expansion of those terms. Further, the right hand side of example Equations 33, 34, 35 is identical to the sum of products of each combination, one at a time, two at a time, etc.

Using the binomial equations illustrated in example Equations 33, 34, 35, the constraint definition for i can be generalized to example Equation 36.

$$z_0 z_1 \prod_{\substack{j=1 \\ j \neq i}}^{t} (1 + z_j) = n_i \quad i = \{1, 2, \dots t\} \quad \text{(Equation 36)}$$

In general, for the total number of units captured (e.g., the total capture count, m), the unit must have been captured in any of the time units, t. As illustrated in examples in example Equations 33, 34, 35, the product of $(1+z_i)$ across all of the time units will always have a unit term of 1. The term 1 represents the unit not yet captured. Thus, the unit not yet captured (e.g., 1) must be subtracted to guarantee the count is only of the units that have been captured. This is illustrated in example Equation 37.

$$z_0 \left( \prod_{j=1}^{n} (1 + z_j) - 1 \right) = n \quad \text{(Equation 37)}$$

In other words, when $z_0$ is distributed in example Equation 37, Equation 37 defines the constraint that all units in the population (e.g., captured and not captured) minus all units that were not captured must equal those that were captured (e.g., the unique capture count, n).

Example Equation 36 and Equation 37 define an expression for each of the t+1 parameters, where instead of $\{\beta_0, \beta_1, \dots, \beta_t\}$ there is $\{z_0, z_1, \dots, z_t\}$ where $z_j = \exp(\beta_j)$. This results in example Equation 38 below.

$$z_0 \left( \prod_{j=1}^{t} (1 + z_j) - 1 \right) = n \quad \text{(Equation 38)}$$

Thus, example Equation 36 and Equation 38 must be solved for $\{z_0, z_1, \dots, z_t\}$.

The unknown estimate of population, Q, can be written in a manner consistent with example Equation 39.

$$Q = z_0 \prod_{j=1}^{t} (1 + z_j) \quad \text{(Equation 39)}$$

Example Equation 39 is independent of an index, as it multiples all terms together. Example Equations 36, 37 can be simplified to example Equation 40 and example Equation 41.

$$Q - z_0 = n \quad \text{(Equation 40)}$$

$$z_i \frac{Q}{1 + z_i} = n_i \quad i = \{1, 2, \dots, t\} \quad \text{(Equation 41)}$$

Example Equation 40 defines that Q is the unknown estimate of population size $\hat{N}$. Example Equations 40, 41 can be rewritten once Q is known, shown in example Equation 42 and example Equation 43.

$$z_0 = Q - n \quad \text{(Equation 42)}$$

$$z_i = \frac{n_i}{Q - n_i} \quad i = \{1, 2, \dots, t\} \quad \text{(Equation 43)}$$

Example Equations 42, 43 can be converted to $\beta$ notation, shown in example Equation 44 and example Equation 45.

$$\beta_0 = \log(Q - n) \quad \text{(Equation 44)}$$

$$\beta_i = \log \left( \frac{n_i}{Q - n_i} \right) \quad i = \{1, 2, \dots, t\} \quad \text{(Equation 45)}$$

It can be observed that example Equation 45 is the log-odds-ratio.

Example Equation 46 below can be used to solve for Q.

$$\frac{Q}{Q - n} = \frac{Q}{z_0} \quad \text{(Equation 46)}$$

$$\frac{Q}{Q - n} = \prod_{i=1}^{t} (1 + z_i) \quad \text{(Equation 47)}$$

-continued $$\frac{Q}{Q-n} = \prod_{i=1}^{t}\left(1 + \frac{n_i}{Q-n_i}\right) \qquad \text{(Equation 48)}$$

$$\frac{Q}{Q-n} = \prod_{i=1}^{t}\left(\frac{Q}{Q-n_i}\right) \qquad \text{(Equation 49)}$$

Taking the reciprocal of both sides of example Equation 49 and simplifying results in example Equation 50.

$$1 - \frac{n}{Q} = \prod_{i=1}^{t}\left(1 - \frac{n_i}{Q}\right) \qquad \text{(Equation 50)}$$

The example population estimator 216 can use example Equation 50 to solve for the population estimate, Q. After solving for Q, example Equation 44 and example Equation 45 can be used to solve for the β parameters. Two additional estimates can also be determined based on the population estimate, Q. For example, the estimated number of units caught in a specific sequence of samples (e.g., resulting in true or false) is defined in a manner consistent with example Equation 51.

$$n(e_1 e_2 e_3 \ldots ) = (Q-n)\prod_{e_j=1}\frac{n_i}{Q-n_i} \qquad \text{(Equation 51)}$$

In another example, the number of units caught among any subset of samples, Ω, is defined in example Equation 52.

$$n(\Omega) = Q\left(1 - \prod_{\Omega}\left(1 - \frac{n_i}{Q}\right)\right) \qquad \text{(Equation 52)}$$

To estimate the population, the population estimator 216 determines a seed population estimate $Q_0$ such that $Q \leftarrow Q_0 > n$. The population estimator 216 can then use example Equation 53 to estimate the population.

$$Q \leftarrow \frac{n}{1 - \prod_{i=1}^{n}\left(1 - \frac{n_i}{Q}\right)} \qquad \text{(Equation 53)}$$

That is, the example population estimator 216 uses the unique capture count (e.g., n) and the one or more sample capture counts (e.g., $n_i$) determined by the example count determiner 210 in example Equation 53 to determine an audience population estimate. In some examples, the population estimator 216 uses iteration to determine an audience population estimate using example Equation 53.

Using the example described above, the count determiner 210 determines $\{n_i\}=\{16, 28, 20, 26, 23, 32\}$ and n=68. The example population estimator 216 may determine the seed population estimate is 100 (e.g., $Q_0=100$). The population estimator 216 uses $n_i$, n, and $Q_0$ to iterate example Equation 53 to determine an audience population estimate. An example iteration process is illustrated in Table 5.

TABLE 5

| k | Q |
|---|---|
| 0 | 100 |
| 1 | 83.6893 |
| 2 | 77.8440 |
| 3 | 75.9314 |
| 4 | 75.3324 |
| 5 | 75.1478 |
| . . . | . . . |
| ∞ | 75.0662 |

Thus, the example population estimator 216 estimates there are 76 individuals in the audience.

The population estimator 216 can further determine the β parameters using example Equations 44, 45. That is, the example population estimator 216 uses the audience population estimate, Q, (e.g., determined using example Equation 53) and the sample capture counts, $n_i$, in example Equations 44 and 45 to determine the β parameters. In the above illustrated example, the population estimator 216 determines $\beta_0=1.9553$ and $\{\beta_i\}=\{-1.306, -0.5194, -1.0128, -0.6351, -0.8170, -0.2970\}$. Thus, the audience population estimate, Q, and β parameters when solved using the log-linear method are identical to audience population estimate and β parameters when solved using example Equations 44, 45, 53.

The example population estimator 216 saves computation time and resources using example Equation 53 to estimate an audience population. For example, if the audience sampler 206 collects 20 samples of varying sizes, the log-linear model requires 21 parameters to estimate the population. Further, the data log for 20 samples has 1,048,575 rows (e.g., $2^{20}-1=1,048,575$). Thus, the data log overall includes 22,020,075 terms (e.g., 21 terms per row=21×1,048,575=22,020,075). In comparison, the example population estimator 216 disclosed herein requires only 21 numbers to generate the same population estimate using example Equation 53 (e.g., 20 sample capture counts+1 unique capture count=21).

In traditional approaches, the terms needed to solve the log-linear model exceed memory limitations of a computer and/or result in relatively long processing times when compared to examples disclosed herein. For example, if the audience sampler 206 collects 100 samples, the data log would have $1.28\times10^{32}$ elements (e.g., (100+1) parameters× $(2^{100}-1)$ rows=$1.28\times10^{32}$). For context, if each element of the data log is represented as a single bit of memory, 1 Terabyte of Random Access Memory (RAM) would not provide adequate storage (e.g., 1 Terabyte would allow $8\times10^{12}$ elements to be saved). However, the example population estimator 216 may only require 101 numbers to estimate an audience population using the same 100 samples (e.g., 100 sample capture counts+1 unique capture count=101) in a manner consistent with example Equation 53. Thus, the population estimator 216 saves computing time and resources using Equation 53 to estimate a population, such that an audience measurement entity can perform multiple large-scale samples (e.g., 50 samples, 100 samples, etc.) and/or large-number repeat sampling. Despite the improved computational efficiency and computing time realized by examples disclosed herein, the example audience estimator 112 facilitates, at least, audience population estimation that would not be practically achievable in a manual manner.

In the illustrated example of FIG. 2, the audience estimator 112 includes a capture database 218 to store the respondent data, the unique capture count, the sample capture count, the total capture count, and the population estimate (s). For example, the audience sampler 206 stores the respondent data (e.g., the Internet cookies, MAC address, etc.) in the capture database 218. In some examples, the count determiner 210 stores the unique capture count, the sample capture count, and/or the total capture count in the capture database 218.

While an example manner of implementing the audience estimator 112 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example network interface 202, the example characteristic identifier 204, the example audience sampler 206, the example respondent identifier 208, the example count determiner 210, the example sample determiner 212, the example recapture probability estimator 214, the example population estimator 216, the example capture database 218 and/or, more generally, the example audience estimator 112 of FIGS. 1 and 2 may be implemented by hardware, software, firmware and/or any combination of hardware, software and/or firmware. Thus, for example, any of the example interface 202, the example characteristic identifier 204, the example audience sampler 206, the example respondent identifier 208, the example count determiner 210, the example sample determiner 212, the example recapture probability estimator 214, the example population estimator 216, the example capture database 218 and/or, more generally, the example audience estimator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example characteristic identifier 204, the example audience sampler 206, the example respondent identifier 208, the example count determiner 210, the example sample determiner 212, the example recapture probability estimator 214, the example population estimator 216, the example capture database 218 and/or the example audience estimator 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience estimator 112 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the audience estimator 112 of FIGS. 1 and 2 are shown in FIGS. 3-6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example audience estimator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
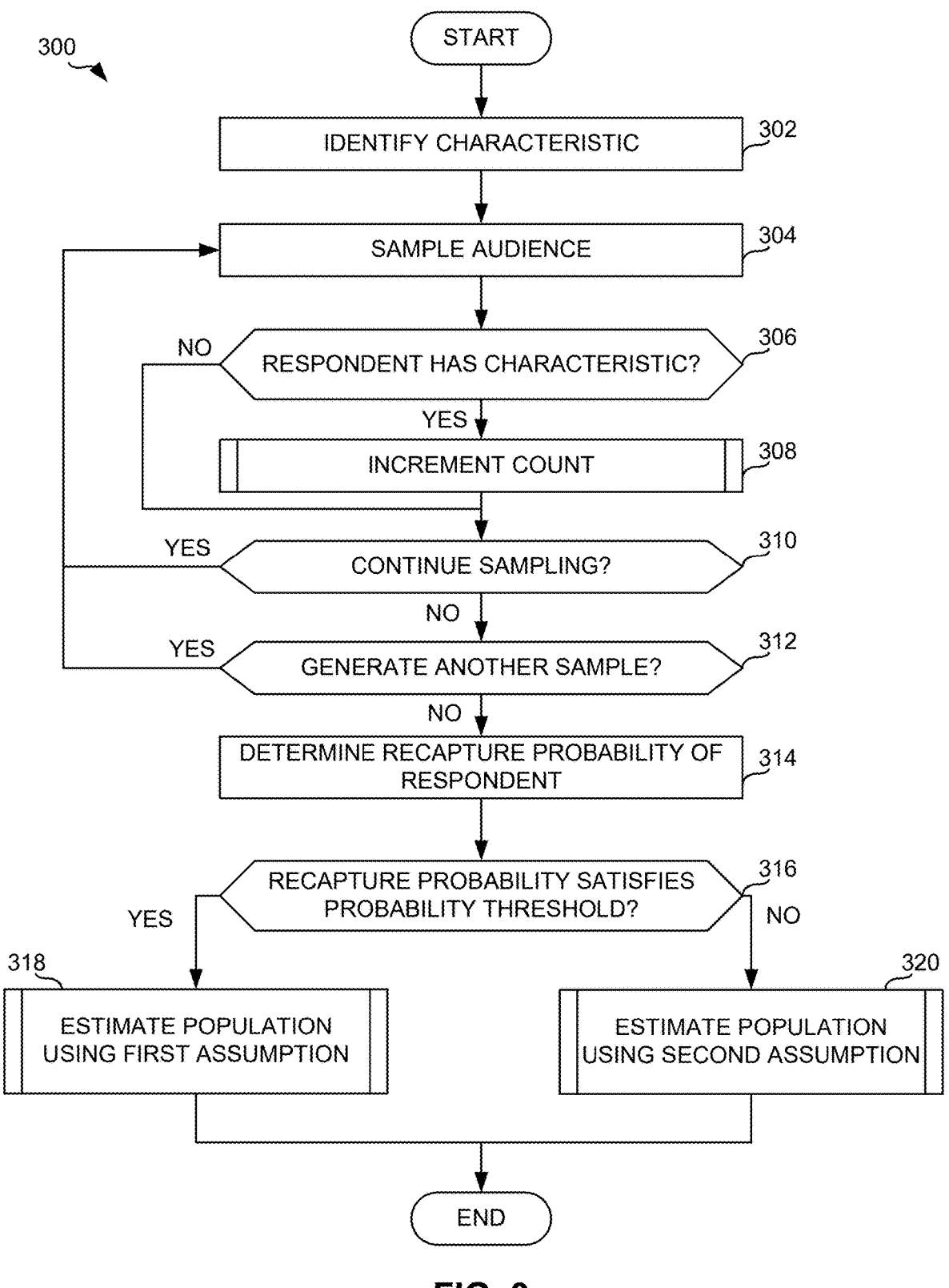
FIGS. 3-6 are flowcharts representative of example methods that may be executed by the example audience estimator of FIGS. 1 and/or 2 to estimate audience populations.

FIG. 3 is a flowchart representative of example machine-readable instructions that may be executed to implement the audience estimator 112 of FIGS. 1 and/or 2. The example machine-readable instructions of FIG. 3 begin at block 302 at which the characteristic identifier 204 identifies a characteristic of interest. In some examples, the characteristic identifier 204 determines what audience population subset is estimated. For example, the characteristic of interest may be whether a respondent visited a website, bought a product, viewed a television program, etc.

At block 304, the example audience sampler 206 samples the audience. For example, the audience sampler 206 accesses the network 108 via the network interface 202 and samples (e.g., obtains, collects, etc.) the audience using Internet cookies, tags, labels, metadata and/or MAC addresses.

At block 306, the example characteristic identifier 204 determines whether the respondent has one or more characteristics of interest (e.g., the characteristic identified at block 302). For example, the characteristic identifier 204 can determine whether the respondent visited a website based on the Internet cookies sampled by the audience sampler 206.

If, at block 306, the characteristic identifier 204 determines the respondent does not have and/or otherwise represent the characteristic of interest, the audience estimator 112 proceeds to block 310. On the other hand, if the example characteristic identifier 204 determines the respondent does have the characteristic of interest (block 306), the count determiner 210 increments at least one count (block 308). For example, the count determiner 210 may increment the unique capture count in response to the respondent not being a recaptured individual (e.g., the respondent is being sampled for the first time). In some examples, the count determiner 210 increments the sample capture count and the total capture count. Additional details on how the count determiner 210 increments one or more counts is further described below in connection with FIG. 4.

The example sample determiner 212 determines whether to continue sampling the audience (block 310), such as by determining whether to collect another sample of the audience (e.g., capture another respondent). For example, the sample determiner 212 may determine to continue sampling the audience if the advertisement of interest is still running (e.g., the duration of the advertisement is not over). In some examples, the sample determiner 212 determines to continue sampling the audience for a threshold time period. If, at block 310, the example sample determiner 212 determines to continue sampling the audience, control returns to block 304.

If the example sample determiner 212 determines to not continue sampling the audience (block 310) (e.g., because a threshold time period is satisfied, an advertisement of interest is no longer being played on media devices, etc.), the sample determiner 212 determines whether to accumulate another sample (block 312). For example, the sample determiner 212 may determine to continue generating samples in response to a sample threshold not being met. In some examples, the sample threshold can be two, five, ten, etc. If, at block 312, the sample determiner 212 determines to accumulate another sample, the audience sampler 206 returns to block 304.

If, at block 312, the sample determiner 212 determines to not accumulate another sample, at block 314, the recapture probability estimator 214 determines a recapture probability of the respondents. For example, the recapture probability estimator 214 may determine the recapture probability is constant. In some examples, the recapture probability estimator 214 may determine the recapture probability varies with time.

At block 316, the population estimator 216 determines whether the recapture probability satisfies a probability threshold. For example, a constant recapture probability may satisfy the probability threshold while a variable recapture probability may not satisfy the probability threshold. If, at block 316, the population estimator 216 determines the recapture probability satisfies the recapture threshold, at block 318, the population estimator 216 estimates the population using a first assumption. For example, the population estimator 216 can use the $M_0$ model to estimate the audience population (e.g., use the population estimator 216 uses example Equation 15). That is, the first assumption can be that the recapture probability of respondents is constant. Additional details on how the population estimator 216 estimates the population using the first assumption is further described in connection with FIG. 5.

If, at block 316, the population estimator 216 determines the recapture probability does not satisfy the recapture threshold, at block 320, the population estimator 216 estimates the population using a second assumption. For example, the population estimator can use the $M_t$ model to estimate the audience population (e.g., the population estimator 216 uses example Equation 53 to determine the population estimate). That is, the second assumption can be that the recapture probability of respondents is not constant (e.g., changes with time). Additional details on how the population estimator 216 estimates the population using the first assumption is further described in connection with FIG. 6.

Figure 4:
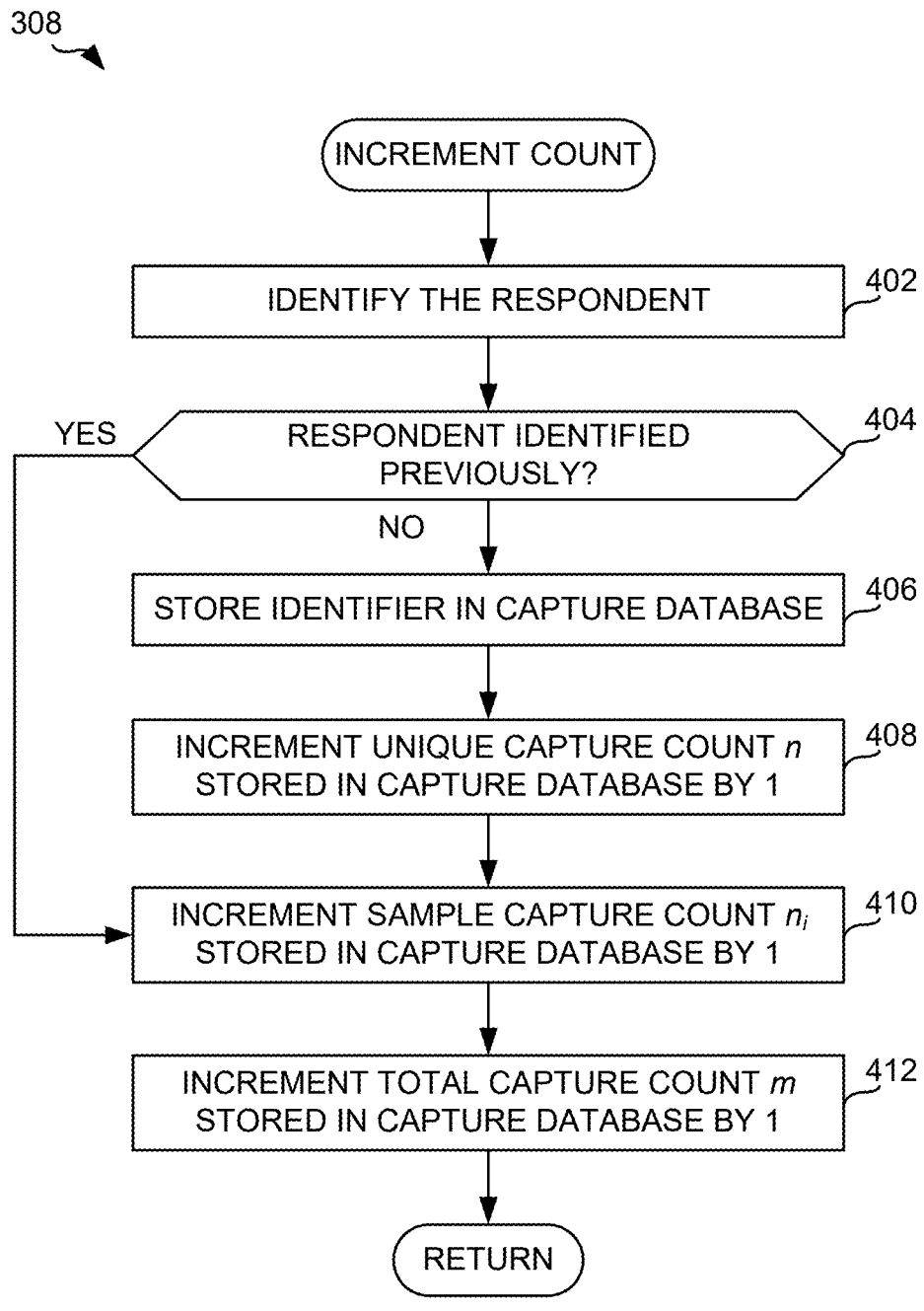

The flowchart of FIG. 4 is representative of example machine-readable instructions that may be executed to implement block 308 of FIG. 3. The example machine-readable instructions of FIG. 4 begin at block 402 at which the respondent identifier 208 identifies the respondent. For example, the respondent identifier 208 may obtain respondent data included in the sample accumulated by the audience sampler 206 at block 304 of FIG. 3. In some examples, the respondent identification data is a MAC address associated with the sample. In some examples, the respondent identification data is a panelist identification number.

At block 404, the respondent identifier 208 determines whether the respondent has been identified previously. That is, the respondent identifier 208 determines whether the respondent is a recaptured individual. In some examples, the respondent identifier 208 can compare the respondent data to previously stored respondent data in the capture database 218. The respondent identifier 208 can determine the respondent is a recaptured respondent if the respondent data matches respondent data stored in the capture database 218. If, at block 404, the respondent identifier 208 determines the respondent has not been identified previously (e.g., the respondent is not a recaptured respondent), at block 406, the respondent identifier 208 stores the identifier of the respondent in the capture database 218. For example, the respondent identifier 208 stores the respondent data of the sampled respondent in the capture database 218 for future matching. If, at block 404, the respondent identifier 208 determines the respondent has been captured previously, the count determiner 210 proceeds to block 410.

At block 408, the count determiner 210 increments the unique capture count, n, stored in the capture database 218 by one. In examples disclosed herein, the unique capture count is only incremented in response to the respondent identifier 208 determining the respondent has not been identified previously. Thus, the unique capture count is a count of respondents without repeats (e.g., a count of respondents that have not been recaptured so far).

At block 410, the count determiner 210 increments the sample capture count, $n_i$, stored in the capture database 218 by one. For example, the count determiner 210 determines the sample index, i, and increments the sample capture count of the $i^{th}$ index. At block 412, the count determiner 210 increments the total capture count, m, stored in the capture database 218 by one. In the example machine-readable instructions of FIG. 4, the count determiner 210 increments the sample capture count and the total capture count for both previously identified and not previously identified respondents. Thus, the sample capture count and the total capture count are counts of both captured and recaptured respondents (e.g., there may be repeated respondents).

Figure 5:
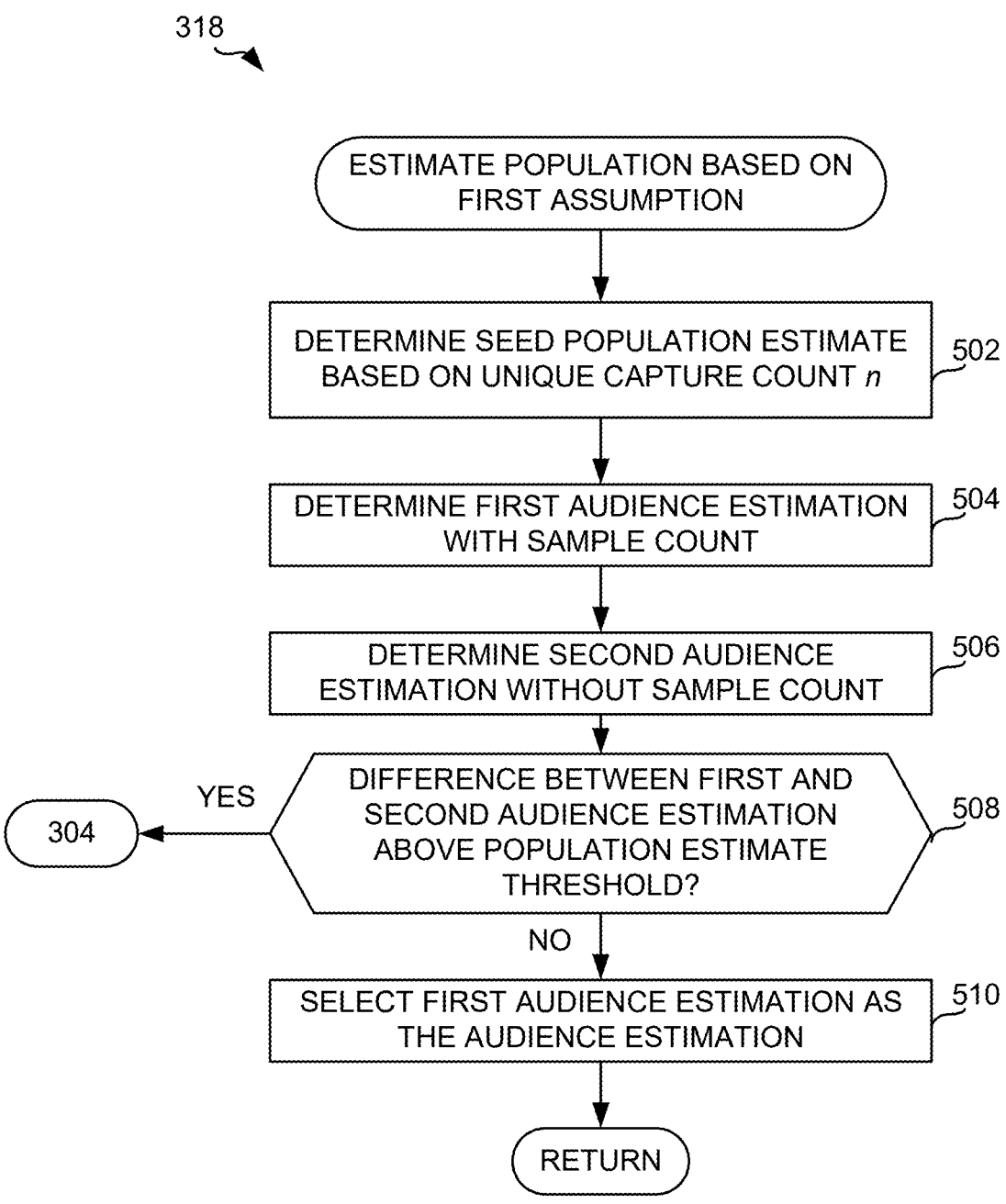

The flowchart of FIG. 5 is representative of example machine-readable instructions that may be executed to implement block 318 of FIG. 3. The example machine-readable instructions of FIG. 5 begin at block 502 at which the population estimator 216 determines a seed population estimate (e.g., starting population estimate) based on the unique capture count, n. For example, the population estimator 216 determines a seed population estimate that is greater than the unique capture count. In some examples, the seed population estimate is a multiple of the unique capture count. However, in other examples the seed population estimate is any value greater than the unique capture count (e.g., rounded to the nearest 10, etc.).

At block 504, the population estimator 216 determines a first audience population estimate with the sample count. That is, the population estimator 216 determines the first audience population estimate based on the unique capture count, the total capture count, the seed population estimate, and the number of samples collected. In examples disclosed herein, the population estimator 216 determines the first audience population estimate based on example Equation 15. That is, the population estimator 216 determines the audience population estimate based on the first assumption (e.g., the recapture probability of respondents is constant).

At block 506, the population estimator 216 determines a second audience population estimate without the sample count. For example, the population estimator 216 determines the second audience population estimate based on the unique capture count, the total capture count, and the seed population estimate. In examples disclosed herein, the second population estimate is not based on the sample count. The population estimator 216 determines the second audience population estimate based on example Equation 19.

At block 508, the sample determiner 212 determines whether the difference between the first and second audience population estimates is above a population estimate threshold. For example, the population estimate threshold may be 5, 10, etc. If, at block 508, the sample determiner 212 determines the difference between the first and second audience population estimate satisfies (e.g., is above) the population estimate threshold, the audience sampler 206 returns to block 304 of FIG. 3. That is, in some examples the sample determiner 212 determines the audience population estimates are not accurate enough (e.g., not enough of the population has been sampled, etc.) in response to the difference between the audience population estimates being greater than the population estimate threshold. Thus, the audience sampler 206 returns to block 304 to collect more samples.

If, at block 508, the sample determiner 212 determines the difference between audience population estimates is not above the population estimate threshold, at block 510, the population estimator 216 selects and stores the first audience population estimate as the audience estimation of the selected characteristic. That is, the population estimator 216 selects the audience population estimate based on the number of samples collected (e.g., using example Equation 15). However, in some examples, the population estimator 216 selects and stores the second audience population estimate (e.g., using example Equation 19). In examples disclosed herein, the audience population estimate stored estimates the reach and frequency of a campaign. For example, the audience population estimate stored can estimate the number of individuals that viewed an advertisement. Thus, the audience population estimate measures the reach (e.g., the number of total unique individuals) of an advertisement campaign. Accordingly, such information is valuable to market analysts, campaign managers and/or other personnel and systems when selecting one or more advertisements of the campaign that exhibit the most favorable reach and/or frequency metrics. In still other examples, such information is useful on a geographic-by-geographic basis to determine which advertisements of the campaign are particularly effective (e.g., advertisements that exhibit relatively high metrics of reach and/or frequency). On the other hand, those advertisements that exhibit relatively low performance metrics (e.g., reach and/or frequency) can be withheld from a particular geographic market, thereby reducing the financial waste of using those advertisements in a non-responsive geography.

Figure 6:
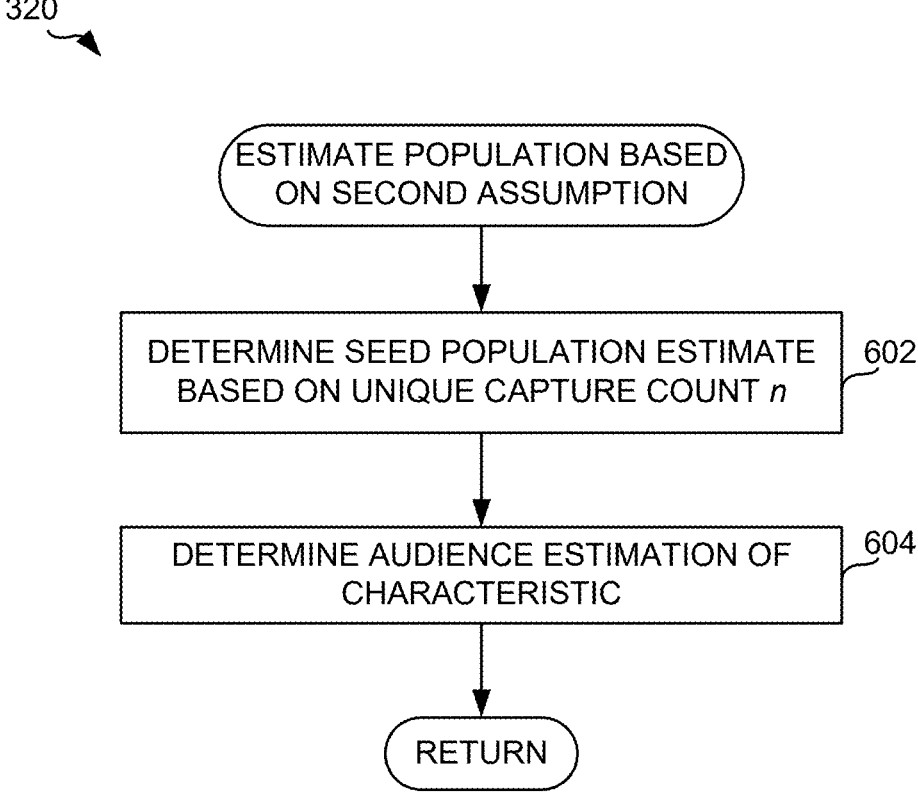

The flowchart of FIG. 6 is representative of example machine-readable instructions that may be executed to implement block 320 of FIG. 3. The example machine-readable instructions of FIG. 6 begin at block 602 at which the population estimator 216 determines a seed population estimate (e.g., starting population estimate) based on the unique capture count, n. For example, the population estimator 216 determines a seed population estimate that is greater than the unique capture count. In some examples, the seed population estimate is a multiple of the unique capture count. However, in other examples the seed population estimate is any value greater than the unique capture count (e.g., rounded to the nearest 10, etc.).

At block 604, the population estimator 216 determines an audience population estimate of the selected characteristic. That is, the population estimator 216 determines the audience population estimate based on the sample capture count, the unique capture count, the seed population estimate, and the number of samples collected. In examples disclosed herein, the population estimator 216 determines the audience population estimate based on example Equation 53. That is, the population estimator 216 determines the audience population estimate based on the second assumption (e.g., the recapture probability of respondents varies based on time). In examples disclosed herein, the audience population estimate stored estimates the reach and frequency of a campaign. For example, the audience population estimate stored can estimate the number of individuals that viewed an advertisement. Thus, the audience population estimate measures the reach (e.g., the number of total unique individuals) of an advertisement campaign. Additionally, and as discussed above, information corresponding to the audience population estimates facilitates an improved efficacy of advertisement selection for a given campaign.

Figure 7:
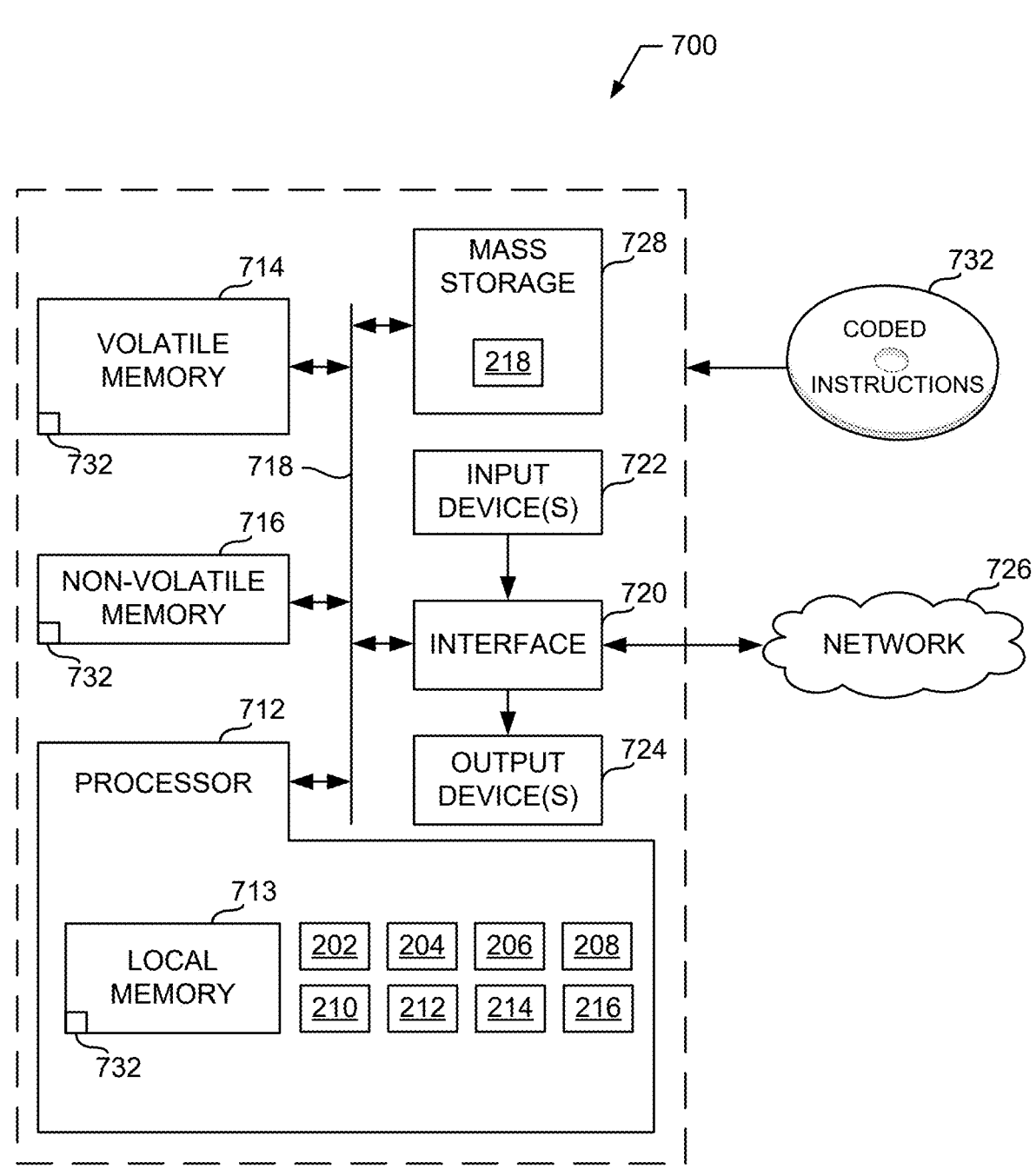
FIG. 7 is a block diagram of an example processing platform structured to execute machine readable instructions to implement the methods of FIGS. 3-6 and/or the example audience estimator of FIGS. 1 and/or 2 to estimate audience populations.

FIG. 7 is a block diagram of an example processor platform 700 structured to execute the instructions of FIGS. 3-6 to implement the audience estimator 112 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example characteristic identifier 204, the example audience sampler 206, the example respondent identifier 208, the example count determiner 210, the example sample determiner 212, the example recapture probability estimator 214, and the example population estimator 216.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that estimate an audience population. The disclosed methods, apparatus and articles of manufacture improve the efficiency of using a computing device by decreasing the number of stored values and computing time. For example, the audience estimator 112 determines whether to collect additional respondent samples based on tradeoffs between estimation accuracy and computing resource requirements. The disclosed methods, apparatus and articles of manufacture are accordingly directed to one or more improvement(s) in the functioning of a computer.

Example methods, apparatus, systems, and articles of manufacture to estimate audience population are disclosed herein. Further examples and combinations thereof include the following:

Example 1 includes an apparatus to estimate audience population, the apparatus comprising a characteristic identifier to determine whether respective ones of respondents are associated with a characteristic, a respondent identifier to determine whether the respective ones of the respondents are recaptured based on a comparison of a person identifier corresponding to respondents associated with the characteristic and a database of previously identified person identifiers, a count determiner to in response to the respective ones of the respondents exhibiting the characteristic, increase a sample capture count by one, and in response to detecting unique instances of the respective ones of the respondents exhibiting the characteristic, increase a unique capture count by one, and a population estimator to, in response to a recapture probability not satisfying a recapture threshold, determine a population estimate having the characteristic based on the sample capture count, the unique capture count, and a number of available samples.

Example 2 includes the apparatus as defined in example 1, wherein the respondent identifier is to identify the person identifier corresponding to the respective ones of the respondents associated with the characteristic.

Example 3 includes the apparatus as defined in example 1, further including a recapture probability estimator to estimate the recapture probability of the respondents.

Example 4 includes the apparatus as defined in example 1, further including an audience sampler to accumulate an audience sample, the audience sample including the respondents.

Example 5 includes the apparatus as defined in example 4, wherein the audience sample includes a first respondent and a second respondent.

Example 6 includes the apparatus as defined in example 5, wherein the first respondent and the second respondent have the same person identifier, the second respondent being a recaptured individual.

Example 7 includes the apparatus as defined in example 6, wherein the audience sample is a first audience sample, and the audience sampler is to accumulate a second audience sample, the second audience sample including a third respondent.

Example 8 includes the apparatus as defined in example 7, wherein the audience sampler is to accumulate the first audience sample for a first time period and accumulate the second audience sample for a second time period.

Example 9 includes the apparatus as defined in example 7, wherein the first respondent and the third respondent have the same person identifier.

Example 10 includes the apparatus as defined in example 4, wherein the audience sampler is to sample from at least one of a server log, a software development kit (SDK) tag, uniform resource locator (URL) redirect, media access control (MAC) address, or internet protocol (IP) address.

Example 11 includes the apparatus as defined in example 1, wherein the person identifier is at least one of an internet cookie, a MAC address, or an IP address.

Example 12 includes a non-transitory computer readable medium comprising instructions that, when executed, cause at least one processor to, at least determine whether respective ones of respondents are associated with a characteristic, determine whether the respective ones of the respondents are recaptured based on a comparison of a person identifier corresponding to respondents associated with the characteristic and a database of previously identified person identifiers, in response to the respective ones of the respondents exhibiting the characteristic, increase a sample capture count by one, in response to detecting unique instances of the respective ones of the respondents exhibiting the characteristic, increase a unique capture count by one, and in response to a recapture probability not satisfying a recapture threshold, determine a population estimate having the characteristic based on the sample capture count, the unique capture count, and a number of available samples.

Example 13 includes the non-transitory computer readable medium as defined in example 12, wherein the instructions, when executed, further cause the at least one processor to identify the person identifier corresponding to the respective ones of the respondents associated with the characteristic.

Example 14 includes the non-transitory computer readable medium as defined in example 12, wherein the instructions, when executed, further cause the at least one processor to estimate the recapture probability of the respondents.

Example 15 includes the non-transitory computer readable medium as defined in example 12, wherein the instructions, when executed, further cause the at least one processor to accumulate an audience sample, the audience sample including the respondents.

Example 16 includes the non-transitory computer readable medium as defined in example 15, wherein the audience sample includes a first respondent and a second respondent.

Example 17 includes the non-transitory computer readable medium as defined in example 16, wherein the first respondent and the second respondent have the same person identifier, the second respondent being a recaptured individual.

Example 18 includes the non-transitory computer readable medium as defined in example 17, wherein the audience sample is a first audience sample, and the instructions, when executed, further cause the at least one processor to accumulate a second audience sample, the second audience sample including a third respondent.

Example 19 includes the non-transitory computer readable medium as defined in example 18, wherein the instructions, when executed, further cause the at least one processor to accumulate the first audience sample for a first time period and accumulate the second audience sample for a second time period.

Example 20 includes the non-transitory computer readable medium as defined in example 18, wherein the first respondent and the third respondent have the same person identifier.

Example 21 includes the non-transitory computer readable medium as defined in example 15, wherein the instructions, when executed, further cause the at least one processor to sample from at least one of a server log, a software development kit (SDK) tag, uniform resource locator (URL) redirect, media access control (MAC) address, or internet protocol (IP) address.

Example 22 includes the non-transitory computer readable medium as defined in example 12, wherein the person identifier is at least one of an internet cookie, a MAC address, or an IP address.

Example 23 includes a method to estimate audience population, the method comprising determining, by executing an instruction with at least one processor, whether respective ones of respondents are associated with a characteristic, determining, by executing an instruction with at least one processor, whether the respective ones of the respondents are recaptured based on a comparison of a person identifier corresponding to respondents associated with the characteristic and a database of previously identified person identifiers, in response to the respective ones of the respondents exhibiting the characteristic, increasing, by executing an instruction with at least one processor, a sample capture count by one, in response to detecting unique instances of the respective ones of the respondents exhibiting the characteristic, increasing, by executing an instruction with at least one processor, a unique capture count by one, and in response to a recapture probability not satisfying a recapture threshold, determining, by executing an instruction with at least one processor, a population estimate having the characteristic based on the sample capture count, the unique capture count, and a number of available samples.

Example 24 includes the method as defined in example 23, further including identifying the person identifier corresponding to the respective ones of the respondents associated with the characteristic.

Example 25 includes the method as defined in example 23, further including estimating the recapture probability of the respondents.

Example 26 includes the method as defined as in example 23, further including generating an audience sample, the audience sample including the respondents.

Example 27 includes the method as defined in example 26, wherein the audience sample includes a first respondent and a second respondent.

Example 28 includes the method as defined in example 27, wherein the first respondent and the second respondent have the same person identifier, the second respondent being a recaptured individual.

Example 29 includes the method as defined in example 28, wherein the audience sample is a first audience sample, and further including generating a second audience sample, the second audience sample including a third respondent.

Example 30 includes the method as defined in example 29, further including generating the first audience sample for a first time period and accumulate the second audience sample for a second time period.

Example 31 includes the method as defined in example 29, wherein the first respondent and the third respondent have the same person identifier.

Example 32 includes the method as defined in example 26, further including sampling from at least one of a server log, a software development kit (SDK) tag, uniform resource locator (URL) redirect, media access control (MAC) address, or internet protocol (IP) address.

Example 33 includes the method as defined in example 23, wherein the person identifier is at least one of an internet cookie, a MAC address, or an IP address.

Example 34 includes an apparatus to estimate audience population, the apparatus comprising means for identifying a characteristic to determine whether respective ones of respondents are associated with a characteristic, means for identifying a respondent to determine whether the respective ones of the respondents are recaptured based on a comparison of a person identifier corresponding to respondents associated with the characteristic and a database of previously identified person identifiers, means for determining counts to in response to the respective ones of the respondents exhibiting the characteristic, increase a sample capture count by one, and in response to detecting unique instances of the respective ones of the respondents exhibiting the characteristic, increase a unique capture count by one, and means for estimating a population to, in response to a recapture probability not satisfying a recapture threshold, determine a population estimate having the characteristic based on the sample capture count, the unique capture count, and a number of available samples.

Example 35 includes the apparatus as defined in example 34, wherein the respondent identifying means is to identify the person identifier corresponding to the respective ones of the respondents associated with the characteristic.

Example 36 includes the apparatus as defined in example 34, further including means for estimating a recapture probability to estimate the recapture probability of the respondents.

Example 37 includes the apparatus as defined in example 34, further including means for audience sampling to accumulate an audience sample, the audience sample including the respondents.

Example 38 includes the apparatus as defined in example 37, wherein the audience sample includes a first respondent and a second respondent.

Example 39 includes the apparatus as defined in example 38, wherein the first respondent and the second respondent have the same person identifier, the second respondent being a recaptured individual.

Example 40 includes the apparatus as defined in example 39, wherein the audience sample is a first audience sample, and the audience sampling means is to accumulate a second audience sample, the second audience sample including a third respondent.

Example 41 includes the apparatus as defined in example 40, wherein the audience sampling means is to accumulate the first audience sample for a first time period and accumulate the second audience sample for a second time period.

Example 42 includes the apparatus as defined in example 40, wherein the first respondent and the third respondent have the same person identifier.

Example 43 includes the apparatus as defined in example 37, wherein the audience sampling means is to sample from at least one of a server log, a software development kit (SDK) tag, uniform resource locator (URL) redirect, media access control (MAC) address, or internet protocol (IP) address.

Example 44 includes the apparatus as defined in example 34, wherein the person identifier is at least one of an internet cookie, a MAC address, or an IP address.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An audience population subset size estimation computing system comprising:

memory having stored therein computer readable instructions;

at least one processor configured to, upon execution of the computer readable instructions, cause performance of a set of operations comprising:

identifying ones of a plurality of respondents included in an audience sample that are associated with a particular characteristic corresponding to an audience population subset;

determining a first sample quantity of the identified ones of the plurality of respondents;

determining a second unique sample quantity of the identified ones of the plurality of respondents having respondent identifiers unique amongst a set of stored respondent identifiers;

incrementing a third unique capture quantity by the second unique sample quantity;

determining a seed population estimate based on the third unique capture quantity, wherein the seed population estimate is greater than the third unique capture quantity; and estimating the audience population subset size based on the first sample quantity, the third unique capture quantity, and the seed population estimate.

2. The audience population subset size estimation computing system of claim 1, wherein the operations further include:

accessing respondent identifiers of the identified ones of the plurality of respondents; and updating the set of stored respondent identifiers to include the identified ones of the plurality of respondents having respondent identifiers unique amongst the set of stored respondent identifiers.

3. The audience population subset size estimation computing system of claim 2, wherein the respondent identifiers include at least one of an internet cookie, a MAC address, or an IP address.

4. The audience population subset size estimation computing system of claim 1, wherein the operations further include estimating a recapture probability of the respondents.

5. The audience population subset size estimation computing system of claim 4, wherein the recapture probability of the respondents varies with time.

6. A method for estimating an audience population subset size, the method comprising:

identifying ones of a plurality of respondents included in an audience sample that are associated with a particular characteristic corresponding to an audience population subset;

determining a first sample quantity of the identified ones of the plurality of respondents;

determining a second unique sample quantity of the identified ones of the plurality of respondents having respondent identifiers unique amongst a set of stored respondent identifiers;

incrementing a third unique capture quantity by the second unique sample quantity;

determining a seed population estimate based on the third unique capture quantity, wherein the seed population estimate is greater than the third unique capture quantity; and estimating the audience population subset size based on the first sample quantity, the third unique capture quantity, and the seed population estimate.

7. The method of claim 6, further comprising:

accessing respondent identifiers of the identified ones of the plurality of respondents; and updating the set of stored respondent identifiers to include the identified ones of the plurality of respondents having respondent identifiers unique amongst the set of stored respondent identifiers.

8. The method of claim 7, wherein the respondent identifiers include at least one of an internet cookie, a MAC address, or an IP address.

9. The method of claim 6, further comprising estimating a recapture probability of the respondents.

10. The method of claim 9, wherein the recapture probability of the respondents varies with time.

11. A non-transitory computer readable storage medium comprising instructions that, when executed, cause at least one processor to cause performance of:

identifying ones of a plurality of respondents included in an audience sample that are associated with a particular characteristic corresponding to an audience population subset;

determining a first sample quantity of the identified ones of the plurality of respondents;

determining a second unique sample quantity of the identified ones of the plurality of respondents having respondent identifiers unique amongst a set of stored respondent identifiers;

incrementing a third unique capture quantity by the second unique sample quantity;

determining a seed population estimate based on the third unique capture quantity, wherein the seed population estimate is greater than the third unique capture quantity; and estimating an audience population subset size based on the first sample quantity, the third unique capture quantity, and the seed population estimate.

12. The non-transitory computer readable storage medium of claim 11, wherein the instructions, when executed, further cause the at least one processor to cause performance of:

accessing respondent identifiers of the identified ones of the plurality of respondents; and updating the set of stored respondent identifiers to include the identified ones of the plurality of respondents having respondent identifiers unique amongst the set of stored respondent identifiers.

13. The non-transitory computer readable storage medium of claim 11, wherein the instructions, when executed, further cause the at least one processor to cause performance of estimating a recapture probability of the respondents.

14. The non-transitory computer readable storage medium of claim 13, wherein the recapture probability of the respondents varies with time.

* * * * *